Dec. 1, 1942.  H. A. MANTZ  2,303,702
THERMOSTATIC CONTROL DEVICE
Filed June 30, 1939
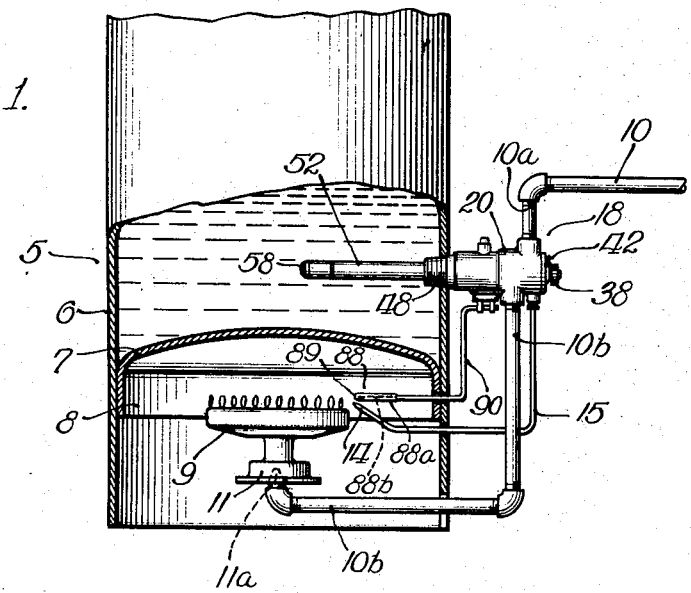
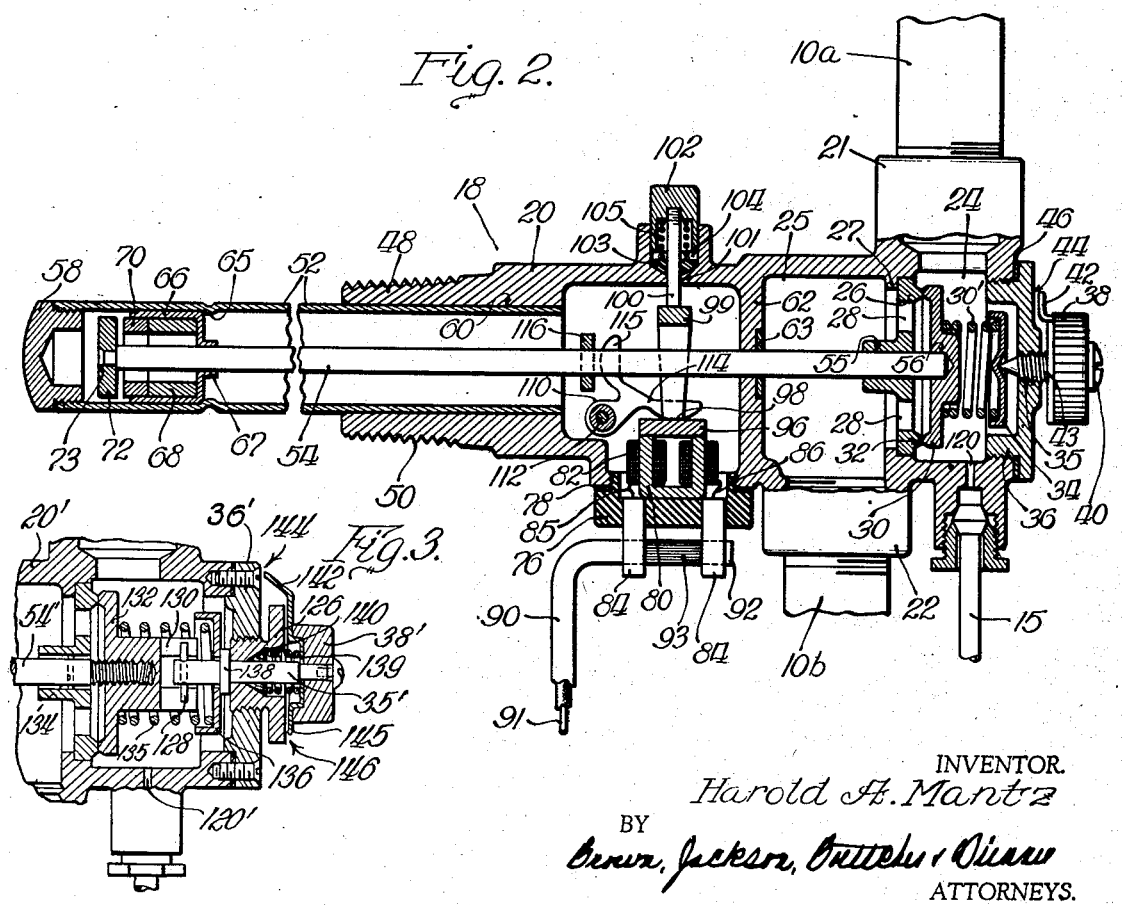
INVENTOR.
Harold A. Mantz
BY
Brown, Jackson, Boettcher & Dienner
ATTORNEYS.

Patented Dec. 1, 1942

2,303,702

UNITED STATES PATENT OFFICE 2,303,702

THERMOSTATIC CONTROL DEVICE

Harold A. Mantz, Milwaukee, Wis., assignor to Milwaukee Gas Specialty Company, Milwaukee, Wis., a corporation of Wisconsin Application June 30, 1939, Serial No. 282,098

15 Claims. (Cl. 236—21)

This invention relates to a thermostatic control device.

While the particular device which I shall describe hereinafter in connection with the drawing is a heat thermostatic control device adapted for use with water heaters and the like, it is to be understood that the invention in its broader aspects is not limited to embodiment in the particular types of devices shown and described. Moreover, the invention is not limited to the particular use shown and described but may be employed for other purposes—for example, in connection with ovens, space heaters, and elsewhere as suitable and desired.

One of the main objects of the invention is to provide an improved form of safety shut-off device under the control of a pilot burner and also under the control of the temperature of the water in the tank in the case of a water heater, or under the control of some other abnormal, defective, or insufficient functioning or non-functioning of the apparatus, whereby the safety shut-off device will operate to safety shut-off position upon extinguishment of the pilot burner and upon an undesirable rise in the temperature of the water in the tank, or upon other abnormal, defective, or insufficient functioning or non-functioning of the apparatus.

Another object of the invention is to provide in a heat regulator of the type comprising means for controlling the supply of fuel to the heating apparatus, means for setting the device for the desired temperature, and thermally operative means for operating the control means with temperature changes to maintain substantially selected temperatures, the combination therewith of safety shut-off means for shutting off the supply of fuel if the water in the tank rises beyond the desired temperature, or upon other abnormal, defective, or insufficient functioning or non-functioning of the apparatus, and also upon extinguishment of the pilot burner.

It is also an object of the invention to provide a device of the class described of simple and inexpensive construction, and which is effective and reliable in operation; also a device which is easy to assemble and install, and a device having a quick or snap acting shut-off for shutting off the supply of fuel not only at the desired temperature or upon other abnormal defective, or insufficient functioning or non-functioning of the apparatus, but also upon extinguishment of the pilot burner.

Further objects and advantages of the invention will appear from the following detailed description taken in connection with the accompanying drawing, in which:

Figure 1 is a vertical section through a fragment of a water heater showing one illustrative embodiment of the invention in connection therewith;

Figure 2 is a vertical section taken axially through the heat regulator and safety shut-off device shown in Figure 1, and on a somewhat larger scale than Figure 1; and Figure 3 is a fragmentary section taken axially through another form of device embodying the present invention.

Referring first to Figure 1, a hot water heater is indicated generally at 5 and comprises a tank 6 adapted to contain the water to be heated. The tank 6 has a bottom 7 defining the upper wall of a heater chamber 8 in which is disposed a main burner 9.

The burner 9 is supplied with fuel by a pipe 10 which is connected to the burner through the body of the heat regulator, as will presently appear. Where the burner is a gas burner, the fuel supply pipe supplies gas thereto, and, in that case, the fuel supply pipe is preferably connected to the burner 9 through a suitable air and gas admixture chamber 11, the fuel delivery nozzle being indicated at 11a.

Associated with or in juxtaposition to the main burner 9 is the usual or any suitable or preferred pilot burner indicated more or less diagrammatically at 14, which pilot burner is intended to remain lighted for the purpose of relighting the main burner upon extinguishment thereof. The pilot burner is supplied with fuel by a pipe 15 connected to the body of the control device, as will be hereinafter described.

The control device, indicated in its entirety at 18, comprises a body or casing 20 having a fuel inlet 21 and an outlet 22 disposed with its axis parallel with the axis of the inlet 21 but offset relative thereto, although this may vary widely. The body or casing 20 is provided with an inlet chamber 24 communicating with the inlet 21, and an outlet chamber 25 communicating with the outlet 22. A valve seat 26 is seated against an annular flange 27, and is preferably held in place by pressed fit in the body 20, or otherwise as desired. The valve seat 26 has ports 28 for placing the inlet chamber 24 in communication with the outlet chamber 25.

A valve disc 30 has an annular raised portion which, in the position shown in Figure 2, seats against the annular raised seat 32, closing and shutting off communication between the inlet chamber 24 and the outlet chamber 25 through the valve seat ports 28. A spring cup 34 has a central depression which seats upon the pointed inner end of an adjusting screw 35. The cup 34 serves as a seat for one end of a compression spring 30' which bears against the valve disc 30 at its other end and tends to hold the valve disc 30 seated or in closed position.

The outer end of the inlet chamber 24 is tapped to receive a valve cap 36, and the screw 35 is threaded through this cap 36 coaxial with respect to the valve disc 30. Fixed against relative rotation on the outer end of the screw 35 and adapted to turn the screw 35 therewith is a temperature selecting or adjusting knob or finger piece 38. The knob 38, which is shown secured to the adjusting screw 35 by a screw 40, may be held against rotation relative to the screw 35 by splining it thereon, or by splaying the outer end of the screw 35 and forming the opening in the knob 38 with a flat portion for cooperation therewith, or otherwise as desired.

A pointer 42 is fixed for example by a nut or other means at 43 to the knob 38. The means at 43, for example, may constitute means for calibrating the pointer with respect to the temperature scale 44 with which the pointer cooperates. The outer end of the pointer 42 moves over a dial or scale marked on the valve cap 36 at 44 upon grasping the knob 38 and turning the same to thread the screw into and out of the valve body. The scale has the usual or any preferred temperature markings the range of which may be of any extent needed for the particular installation. A suitable gasket may be provided at 46 between the valve body and the flange on the cap 36.

The body or casing 20 of the device has an extension 48. This extension 48 is externally threaded at 50 to adapt it to be mounted in the shell or wall of the tank 6 as shown, for example, in Figure 1. The inlet 21 and outlet 22 are tapped internally to receive, respectively, the inlet and outlet pipe sections 10a and 10b of the fuel supply pipe 10 for the main burner.

A tube 52 preferably formed of metal or other good heat conducting material extends into the tank 6 for contact with the water therein. A rod 54 is disposed coaxially within the tube 52. The rod 54 is slidable axially through an opening 55 in the valve seat 26, and, at its outer end, engages or is secured in an axial recess 56 in the valve disc 30. The inner end of the tube 52 is closed by a plug 58 having threaded engagement therein. The other end of the tube 52 is secured to the body 20 as by means of a pressed fit in the extension 48, as indicated at 60. The rod 54 has sliding support at a position spaced inwardly from the valve seat 26 in the wall or partition 62 of the valve body. The opening in the wall 62 through which the rod 54 slides may be sealed in any suitable or desired manner, for example, as indicated diagrammatically at 63.

Spaced outwardly from its inner end the tube 52 has an annular depression forming an internal annular bead or shoulder 65. A cup 66 seats against the annular bead or shoulder 65 and is held in place in the tube 52 by pressed fit therein, or otherwise as desired. The cup 66 is preferably formed of good heat-conducting metal in good heat-conducting contact with the tube 52. The outer end of the cup 66 has an opening surrounded by an annular flange 67 in which the rod 54 has sliding support.

Fixed by pressed fit, or otherwise, in the cup 66 and in good heat-conducting contact therewith is a permanent magnet 68 which, in the illustrated embodiment of the invention, is of annular form. With the increased magnetic strength now available with the proper materials and the right treatment, the permanent magnet 68 may be relatively small and, at the same time, will have suitable strength for the intended purpose. Also fixed by pressed fit, or otherwise, in the cup 66 and against the permanent magnet 68 is an annular member 70 which is made of a relatively low temperature sensitive magnetic alloy or a relatively low Curie point material well known in the art. The permanent magnet 68 constitutes a source of magnetic flux for the Curie point member 70.

The member 70, by reason of the material of which it is composed and its position against or in proximity to the permanent magnet 68, is ordinarily magnetic but becomes substantially non-magnetic or of reduced magnetic strength when heated to a sufficiently high temperature. In the illustrated embodiment of the invention the critical temperature at which the member 70 becomes non-magnetic, or at least of insufficient magnetic strength to hold the armature 72 in attracted position, is the temperature at which it is desired to operate the safety shut-off means to shut off the supply of fuel to the main burner.

The armature or keeper 72 is fixed at 73 upon the inner end of the thermostat rod 54, and is movable within the tube 52 lengthwise thereof and between the plug 58 and the relatively low Curie point metal member 70. The armature or keeper 72 is formed of soft iron or of an alloy or other suitable material adapted to be held in attracted position against the Curie point member 70 as long as this member is magnetic and to be released for movement to retracted position at the critical temperature at which the member 70 becomes non-magnetic, or at least of insufficient magnetic strength to hold the armature 72 in attracted position.

To the left of the wall or partition 62 as the device is viewed in Figure 2, the body 20 has an opening in which an electromagnet carrying member 76 is secured, for example by threaded engagement as shown. A suitable gasket 78 may be provided between the valve body 20 and the flange on the member 76.

The electromagnet carried by the member 76 comprises a generally U-shaped magnet frame 80 suitably secured to the member 76 and a coil 82 wound about the legs of the magnet frame. The magnet frame need not be U-shaped, but may be of any other suitable form. Although any other form of thermocouple connector means may be employed in the illustrated embodiment of the invention, the member 76 is formed of insulating material and carries a pair of metallic terminal connectors 84 connected, respectively, as shown diagrammatically at 85 and 86 to the terminals of the coil 82. If desired, one terminal of the coil may be grounded for example, to the valve body, in which case only one terminal connector is required. The cap or member 76 and the thermocouple connector means thereon, as well as the cooperating thermocouple connector means on the adjacent end of the lead connection are of the general character illustrated and described in the copending application of Clarence Wantz, Serial No. 239,790, filed November 10, 1938.

A thermocouple 88 is placed in position to be heated by the pilot light, and is connected in circuit with the electromagnet, and particularly with the coil 82 thereof. The thermocouple 88 and the lead connection therefor are of the general character disclosed and claimed in Oscar J. Leins Patent No. 2,126,564, granted August 9, 1938. Any other suitable form of thermocouple and lead connection may be employed within the scope of the present invention.

Suffice it to state that the thermocouple shown in the drawing comprises an outer tubular thermocouple element 88a and an inner thermocouple element 88b joined to form the thermal junction 89 which is positioned to be heated by the pilot light. The lead connection comprises an outer tubular lead conductor 90 connected at one end to the outer thermocouple element 88a, and an inner lead conductor 91 insulated from the outer lead conductor and connected at one end to the inner thermocouple element 88b.

At the opposite end, the inner lead conductor 91 extends from the outer lead conductor 90 and has a metallic terminal sleeve 92 fixed thereon in good conductive contact therewith and spaced from the end of the outer heat conductor 90. An insulating sleeve 93 is interposed between the terminal sleeve 92 and the adjacent end of the outer lead conductor 90.

A quick detachable connection is thus provided between the thermocouple lead and the terminals 84 for the electromagnet coil 82. The thermocouple is connected to the terminals 84 by slipping the terminal end of the thermocouple lead means through an opening in one terminal 84 and into the opening in the other terminal, with the terminal sleeve 92 in the opening in one terminal and the end of the tubular thermocouple lead 90 in the opening in the other terminal. The terminals 84 may be split at their outer ends and screws (not shown) provided for clamping the split portions of these terminals into good conductive contact and gripping engagement with the terminal sleeve 92 and the tubular lead 90, respectively.

The electromagnet is provided with an armature 96 which is secured or connected at 98 to a yoke 99. The yoke 99 straddles the rod 54 within the housing or body 20 and has secured thereto a reset stem 100. The stem 100 extends out through an opening 101 in the valve body and has a reset button 102 secured on its outer end. Suitable packing at 103 seals the opening 101, and the button 102 operates sliding in the recess 104. A coiled spring 105 surrounds the stem 100 and is interposed between the button 102 and the packing 103. The spring 105 holds the packing 103 tightly in sealing relation about the stem 100 and against the valve body adjacent the opening 101. The spring 105 also serves to return the button 102 to outwardly projected position, and the armature 96 to retracted position, when the electromagnet is deenergized by extinguishment of the pilot light.

A bell crank lever 110 is pivoted in the housing or body 20 at 112, and has one arm 114, which engages or cooperates with the armature 96, and a second arm 115, which engages or cooperates with an abutment or flange 116, fixed on the rod 54.

In operation, as long as the temperature to which the Curie point member is subjected is below the critical temperature and the electromagnet is energized by the heat of the pilot flame the keeper 72 is attracted and held in attracted position. Movement of the armature or keeper 72 to attracted position causes endwise movement of the rod 54 to the right as viewed in Figure 2. This moves the valve disc 30 from its seat 32 thereby opening the valve to set up and maintain a supply of fuel to the main burner as long as the armature is in attracted position.

The supply of fuel for the pilot burner is established through a passageway 120 in the valve body 20. This passageway by-passes the valve member 30 to supply fuel to the pilot burner 14 regardless of whether the valve 30 is open or closed.

If the safety temperature of the water in the tank 6 is exceeded, the Curie point member 70 instantly becomes non-magnetic or of insufficient magnetic strength to hold the armature or keeper 72 in attracted position. As a result, the armature is released and the spring 30' moves the valve member 30 to closed position completely to shut off the supply of fuel to the main burner 9. Upon movement of the valve member 30 to closed position the armature 72 is moved to retracted position as shown in Figure 2.

On the other hand, upon extinguishment of the pilot flame the electromagnet, comprising the magnet frame 80 and the coil means 82, ceases to be energized sufficiently to hold the armature 96 in attracted position. As a result, the armature 96 is released and the spring 105 moves the armature 96 to retracted position and the reset button 102 to outwardly projected position. The armature 96, in its movement to retracted position, acts through its cooperation with the arm 114 of the bell crank lever 110 to swing this lever in a counterclockwise direction about its pivot 112 as the device is viewed in Figure 2. As a result of this counterclockwise movement of the lever 110, the arm 115 thereof, by its cooperation with the abutment or flange 116, forces the rod 54 to the left as viewed in Figure 2 and thereby the armature or keeper 72 into retracted position. The disengagement of the keeper 72 from the Curie point member 70, notwithstanding the action of this member 70 in holding the keeper 72 in attracted position, permits the spring 30' to move the valve member 30 to closed position completely to shut off the supply of fuel to the burner 9.

When the temperature drops below the predetermined temperature with the pilot light burning the Curie point member becomes magnetic or of sufficient magnetic strength to attract the armature 72 moving the valve to open position and maintaining same open until the predetermined temperature is again reached or exceeded or until the pilot light is extinguished.

By rotating the knob or finger piece 38 to set the pointer 42 at the desired temperature marking at 44, the spring 30' is tensioned an amount to actuate the keeper to retracted position and close the valve 30 at the selected temperature. Therefore, when I refer to the critical temperature of the Curie point member 70 I refer to the temperature at which the Curie point member becomes of insufficient magnetic strength to hold the valve 30 open against the tension of the spring for the particular setting as indicated by the pointer 42. Of course, the critical temperature may be the temperature at which the Curie point member becomes actually non-magnetic or substantially non-magnetic.

Instead of relying on the spring 105 to actuate the rod 54 endwise by the actuator 110, an additional spring or other means may be provided for this purpose.

The armature 96 is reset to attracted position by pressing the reset button 102 inwardly against the tension of the spring 105. With the pilot burner lighted and the electromagnet energized by the heat of the flame of the pilot burner on the thermocouple 88 the armature 96 is held in attracted position by the magnetic flux set up by the thermoelectric current when reset to attracted position, as described.

From the foregoing it will be apparent that if either the pilot flame is extinguished or the desired safety temperature is exceeded, the armature or keeper 72 is released and the valve 30 closes to shut off the supply of fuel to the main burner.

In the embodiment of the invention illustrated in Figure 1 the Curie point member 70 is of such character that its critical temperature at which it becomes non-magnetic or at least of insufficient magnetic strength to hold the keeper 72 in attracted position is the same as the maximum safety temperature of the water in the tank. This may vary widely. Where the device is used in connection with oven heaters, space heaters, or other devices, the Curie point member 70 will be of such character that its critical temperature will be the same as the maximum safety temperature at which the safety shut-off device is to operate to shut off the supply of fuel to the main burner. Where the device is to operate to safety shut-off position upon other abnormal, defective, or insufficient functioning or non-functioning of the apparatus, an electric or other heater circuit may be provided for heating the Curie point material, and this circuit may be controlled by such other abnormal, defective, or insufficient functioning or non-functioning of the apparatus.

From the foregoing it will be apparent that the device is of simple and inexpensive construction, is effective and reliable in operation, is easy to assemble and install, and has a quick or snap acting shut-off for shutting off the supply of fuel at the desired temperature or upon other abnormal, defective, or insufficient functioning or non-functioning of the apparatus, and also upon extinguishment of the pilot flame.

I have described the invention in connection with the details of a particular embodiment, but I do not intend thereby to limit the invention to such details, nor do I intend to be limited to the paricular embodiment and relation of the essential features shown and described.

For example, within the broader aspects of the invention the valve member 30 constitutes a control member. An electric switch may, within such broader aspects, be employed in lieu of the valve member 30. Where employed in lieu of the valve member 30 of the present invention, such switch may be held closed as long as the Curie point member 70 is magnetic and the electromagnet is energized, and released for actuation to open circuit position upon heating of the Curie point member to its critical temperature, or upon extinguishment of the pilot flame. The switch may, for example, maintain a circuit for a solenoid or motor valve closed to hold such valve open for a supply of fuel as long as the Curie point member is not heated to its critical temperature and the pilot burner is ignited. Then at the critical temperature, or upon extinguishment of the pilot flame, the switch may open the circuit for the solenoid or motor valve, and this valve may operate to closed position to shut off the supply of fuel to the main burner.

In Figure 3 I have shown the invention embodied in a heat regulator of the type comprising means for controlling the supply of fuel to the heating apparatus, means for setting the device for the desired temperature, and thermally operative means for operating the control means with temperature changes to maintain substantially selected temperatures.

This latter embodiment of the invention is the same as the preceding embodiment except in the following respects. The tube and rod 54' constitute in this case a rod and tube type thermostat well known in the art. The tube is composed of a thermally responsive metal which has a coefficient of expansion different from the coefficient of expansion of the metal rod 54'. In the particular embodiment shown in Figure 3, the coefficient of expansion of the tube is greater than that of the rod 54'. The rod may, for example, be made of a material which is substantially free from contraction and expansion under temperature changes, and the tube may be made of a metal having a relatively high coefficient of expansion.

The stem 35' constitutes a temperature adjusting or selecting stem that extends through and is rotatable in a limit control member 126. At its inner end the stem 35' has a diametrically extending pin 128 or other means which engages, for example, in a diametrical slot 130 in the outer end of the valve member 132 to turn the valve member 132 upon rotation of the stem 35'. The valve member 132 is threaded upon the outer end of the thermostat rod 54', and the rod 54' is splined or keyed against turning movement, for example at 134, being at the same time free for endwise movement as before. The spring 135, which corresponds with the spring 30' of the preceding embodiment, is interposed between the valve member 132 and the spring cup 136.

The limit control member 126 is threaded through the valve cup 36', and the stem 35' has a flange or shoulder 138 which is positioned between the spring cup 136 and the inner end of the member 126. A spring 139 holds the flange or shoulder 138 against the inner end of the limit control member 126, and also serves to compress and hold the packing 140 in tight sealing relation about the stem 35' and the opening in the member 126 through which the stem extends.

In operation of the embodiment shown in Figure 3, by grasping the knob 38' and turning the stem 35', the valve may be threaded along the rod 54' to provide any desired amount of valve opening to maintain any desired temperature as indicated by the pointer.

With the selecting means set to provide a valve opening for the selected temperature if the temperature exceeds the selected temperature, there will be a proportionate expansion of at least the thermally sensitive tube. The tube expanding at least more than the rod 54' tends to draw the valve closer to its seat to maintain the selected temperature. If the temperature drops below the selected temperature, the tube contracts with respect to the rod 54' and, as a result, the rod forces the valve 132 farther away from its seat to increase the valve opening.

The shut-off temperature may be adjusted by turning the limit control member to increase or decrease the tension in the spring 135. When the knob 38' is turned to adjust the position of the valve member 132, the movement of the valve member 132 changes the tension in the spring 135 and, thereby, the shut-off or limit control temperature. However, by turning the limit control member 126, the shut-off temperature may be adjusted to any desired temperature with any selected positioning of the valve member 132.

For the purpose of indicating the shut-off or limit control temperature and the temperature which the thermostat is to maintain the knob 38' has a pointer 142 which turns with the knob 38' and stem 35', and may be set and secured in different angular positions with respect to the stem 35' to calibrate it relative to its scale. The pointer 142 is shown as cooperating with a dial or scale marked, for instance, on the valve cap 36', at 144, to indicate the temperature which the valve member 132 is set to maintain. Either a portion of the same pointer 142 or another pointer 145, which also turns with the knob 38' and stem 35', cooperates with a dial or scale marked, for instance, on the limit control member 126 at 146 to indicate the temperature at which the Curie point member will operate to release the valve member for movement to safety shut-off position.

Turning of the member 126 to bring any desired temperature marking thereon in register, for instance, with the pointer 145 sets the device so that the valve member 132 will close at that temperature. Turning of the knob 38' to bring the pointer 142 into register with the desired temperature marking on the scale or dial 144 sets the valve member 132 in position to maintain the selected temperature. When the position of the valve is changed to change the temperature to be maintained and thereby, by changing the tension in the spring 135, changes the safety shut-off temperature, the device may be set for the same safety shut-off temperature as before, or for any other safety shut-off temperature, by turning the limit control member 126.

I claim:

1. In a device of the class described, in combination, a housing, a control member in said housing, a rod extending into said housing and cooperating with said control member, a keeper on said rod, magnetic means comprising a Curie point member for attracting and holding said keeper attracted to move said control member to operating position and to hold same in said position, an electromagnet remote from said Curie point member, an armature for said electromagnet, and an actuator operated by the movement of said armature and independently of the temperature adjacent said Curie point member for actuating said rod in a direction to compel said keeper to retracted position and to release said control member for movement to safety position.

2. In a device of the class described, in combination, a housing, a valve member in said housing, a rod extending into said housing and cooperating with said valve member, a keeper on said rod, magnetic means comprising a Curie point member for attracting and holding said keeper attracted to open and hold said valve open, an electromagnet remote from said Curie point member, an armature for said electromagnet and an actuator operated by movement of said armature and independently of the temperature adjacent said Curie point member for compelling said keeper to retracted position and said valve to closed position.

3. In a device of the class described, in combination, a housing, a valve member in said housing, a rod extending into said housing and cooperating with said valve member, a keeper on said rod, magnetic means comprising a permanent magnet and a Curie point member for attracting and holding said keeper attracted to open and hold said valve open, an electromagnet, an armature for said electromagnet, an actuator operated by movement of said armature for compelling said keeper to retracted position and said valve to closed position independently of the temperature adjacent said Curie point member, and a tube enclosing said rod, said tube being secured to said housing and supporting said permanent magnet and said Curie point member, said electromagnet having support on said housing.

4. In a device of the class described, in combination, a housing, control means in said housing, magnetic means comprising a Curie point member for rendering said control means operative at temperatures below the critical temperature of the Curie point member and releasing said control means for movement to safety position at substantially the critical temperature of said Curie point member, an electromagnet controlled by an abnormal condition other than the temperature adjacent said Curie point member, an armature adapted to be held to said electromagnet and to be released for movement to retracted position, and an actuator actuated by movement of said armature to retracted position for releasing said control means for movement to safety position.

5. In a device of the class described, in combination, a housing, control means in said housing, magnetic means comprising a Curie point member for rendering said control means operative at temperatures below the critical temperature of the Curie point member and releasing said control means for movement to safety position at substantially the critical temperature of said Curie point member, a thermocouple subject to the heat of a flame, an electromagnet connected in circuit with said thermocouple, an armature adapted to be held to said electromagnet as long as the thermocouple is heated by the flame and to be released for movement to retracted position upon extinguishment of the flame, an actuator actuated by movement of said armature to retracted position for releasing said control means for movement to safety position, and means for resetting said armature to attracted position.

6. In combination, a main burner, a fuel supply pipe leading to said burner, a valve in said pipe, a pilot burner in juxtaposition to said main burner, a thermocouple placed in position to be heated by said pilot burner, magnetic means comprising a Curie point member for rendering said valve operative at temperatures below the critical temperature of the Curie point member and for releasing said valve for movement to closed position at substantially the critical temperature of said Curie point member, an actuator for releasing said valve member for movement to closed position, an armature for actuating said actuator, and an electromagnet connected in circuit with said thermocouple for holding said armature in attracted position as long as said thermocouple is heated by said pilot burner.

7. In a device of the class described, in combination, a housing, control means in said housing, a rod and tube thermostat extending from said housing, said rod cooperating with said control means to operate said control means and maintain substantially selected temperatures, magnetic means comprising a Curie point member for rendering said rod operative with temperature changes below the critical temperature of said Curie point member and releasing said rod for movement of said control means to safety position at substantially the critical temperature of said Curie point member, an electromagnet, an armature for said electromagnet, said armature having attracted and retracted positions, and an actuator actuated by movement of said armature to retracted position for forcing said rod in a direction to release same from said Curie point member.

8. In a device of the class described, in combination, a housing, control means in said housing, a rod and tube thermostat extending from said housing, said rod cooperating with said control means to operate said control means and maintain substantially selected temperatures, magnetic means comprising a Curie point member for rendering said rod operative with temperature changes below the critical temperature of said Curie point member and releasing said rod for movement of said control means to safety position at substantially the critical temperature of said Curie point member, an electromagnet disposed substantially normal to said rod, an armature for said electromagnet, said armature having attracted and retracted positions, an abutment on said rod, and a pivoted actuator cooperating with said armature and with said abutment and actuated by movement of said armature to retracted position for forcing said rod in a direction to release same from said Curie point member.

9. In a device of the class described, in combination, a housing, control means in said housing, a rod and tube thermostat extending from said housing, said rod cooperating with said control means to operate said control means and maintain substantially selected temperatures, magnetic means comprising a Curie point member for rendering said rod operative with temperature changes below the critical temperature of said Curie point member and releasing said rod for movement of said control means to safety position at substantially the critical temperature of said Curie point member, an electromagnet, an armature for said electromagnet, spring means for moving said armature to retracted position, reset means for resetting the armature into attracted position, and an actuator cooperating with said armature and with said rod and actuated by movement of the armature to retracted position for forcing said rod in a direction to release same from said Curie point member.

10. In a device of the class described, in combination, a housing, a control member in said housing, a spring retainer in said housing, a spring interposed between said control member and said retainer, selecting means cooperable with said spring retainer for setting said control member to different selected positions, a rod and tube thermostat extending from said housing, said rod cooperating at one end with said control member to operate said control member and maintain substantially selected temperatures, a keeper on the opposite end of the rod, magnetic means comprising a Curie point member fixed in said tube and adapted to hold said keeper in attracted position for actuation of said control member by said thermostat upon changes in temperature below the critical temperature of said Curie point member, and releasing said keeper for movement of said control member to safety position at substantially the critical temperature of said Curie point member, a thermocouple subject to the heat of a flame, an electromagnet connected in circuit with said thermocouple, an armature adapted to be held to said electromagnet as long as the thermocouple is heated by the flame and to be released for movement to retracted position upon extinguishment of the flame, an actuator actuated by movement of said armature to retracted position for releasing said control means for movement to safety position, and means for resetting said armature to attracted position.

11. In combination, a control member, a stem therefor, an abutment on said stem, an electromagnet disposed at substantially right angles to said stem, an armature adapted to be held in attracted position by said electromagnet and adapted for movement to retracted position when the magnetic action of said electromagnet is insufficient to hold the armature in attracted position, an actuator pivoted for swinging movement and cooperating with the armature and with the abutment on said stem for actuating the stem in a direction to release said control member for movement to safety position by movement of the armature to retracted position, a keeper on said stem, and magnetic means comprising a Curie point member for holding said keeper attracted and thereby the control member in operative position at temperatures below the critical temperature of the Curie point member and releasing said keeper for movement of the control member to safety position at substantially the critical temperature of said Curie point member.

12. In a device of the class described, in combination, a valve, a tube, a rod disposed within said tube and cooperating with said valve at its outer end, magnetic means comprising a Curie point member near the inner end of said tube for holding the inner end of said rod to said tube to hold said valve open at temperatures below the critical temperature of the Curie point member, means at the outer end of the device for adjusting the temperature at which the valve is released for movement to safety shut-off position, and actuator means cooperable with said rod intermediate its ends and also adapted for releasing said valve for movement to safety shut-off position.

13. In a device of the class described, in combination, a valve body, a valve member within said valve body, a tube, a rod disposed within said tube and having motion imparting cooperation with said valve member, means wholly within said tube and at the inner end of said rod for holding said rod shifted to position for holding said valve member open, said tube being imperforate adjacent to said holding means, said last means being operable to release said rod for movement of said valve member to closed position upon occurrence of an abnormal condition, means cooperable mechanically with said rod intermediate its ends and adapted for actuating said rod endwise in a direction to release said holding means for movement of said valve member to closed position, a spring abutment member disposed within said valve body outwardly of said valve member, a spring interposed between said valve member and said abutment member for moving said valve member to closed position, and an adjusting screw carried by the valve body and cooperable with said abutment member to adjust the temperature at which the inner end of the rod is released.

14. In a device of the class described, a rod adapted for endwise movement, a valve member disposed at one end of said rod, magnetic means comprising a Curie point member at the opposite end of said rod for holding the rod in position to hold said valve member open and operative at a predetermined temperature to release said rod for movement of the valve member to closed position, an electromagnet remote from said Curie point member and having a movable armature, and an actuator operated by movement of said armature to retracted position and cooperating mechanically with said rod to actuate the same in a direction to release the rod from the Curie point member for movement of the valve to closed position.

15. In a device of the class described, in combination, a valve, a rod having motion imparting cooperation with said valve, means for holding said rod shifted to position for holding said valve open, an electromagnet disposed within the length of said rod and with its axis directed generally laterally relative to the axis of the rod, an armature for said electromagnet, an abutment on said rod, an actuator cooperating with said abutment and said armature for shifting said rod in a direction for movement of said valve to closed position upon movement of said armature to retracted position, means at the opposite side of said rod for cocking said armature to attracted position, and means straddling said rod and operatively connecting said cocking means and said armature.

HAROLD A. MANTZ.